Aug. 7, 1956     G. A. LYON     2,757,978
WHEEL COVER
Filed April 2, 1954     4 Sheets-Sheet 3

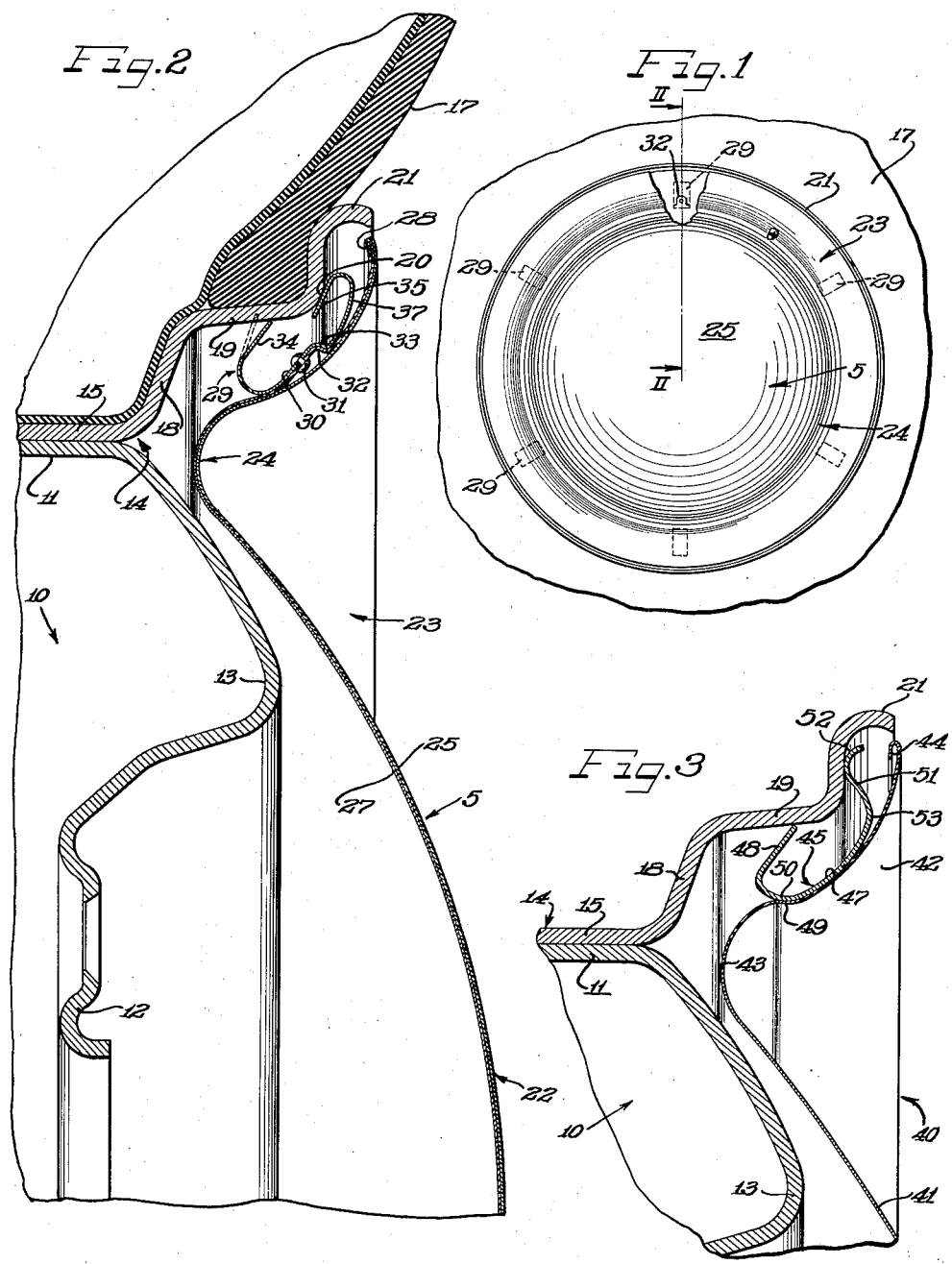

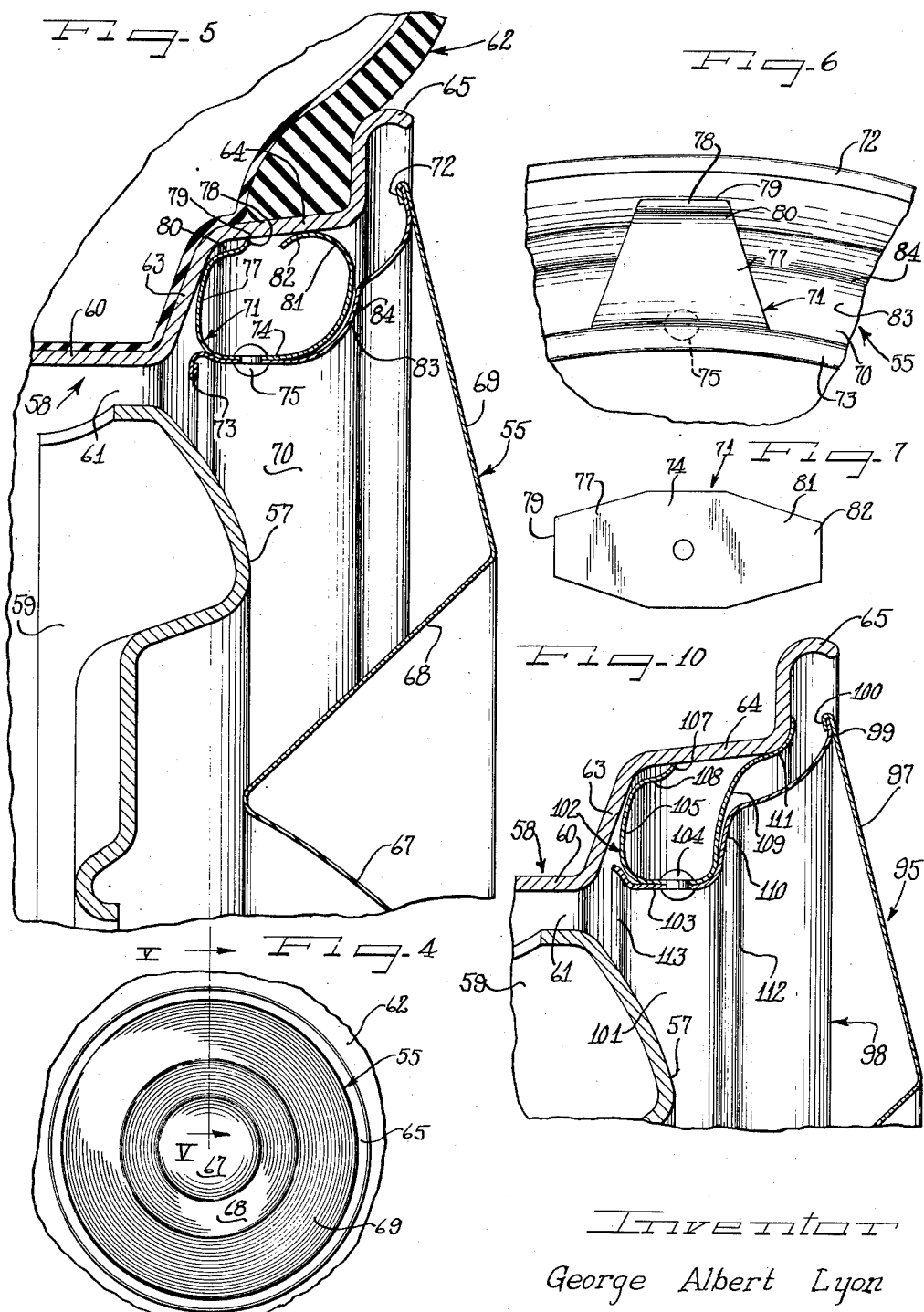

Inventor
George Albert Lyon

Aug. 7, 1956  G. A. LYON  2,757,978
WHEEL COVER
Filed April 2, 1954  4 Sheets-Sheet 4
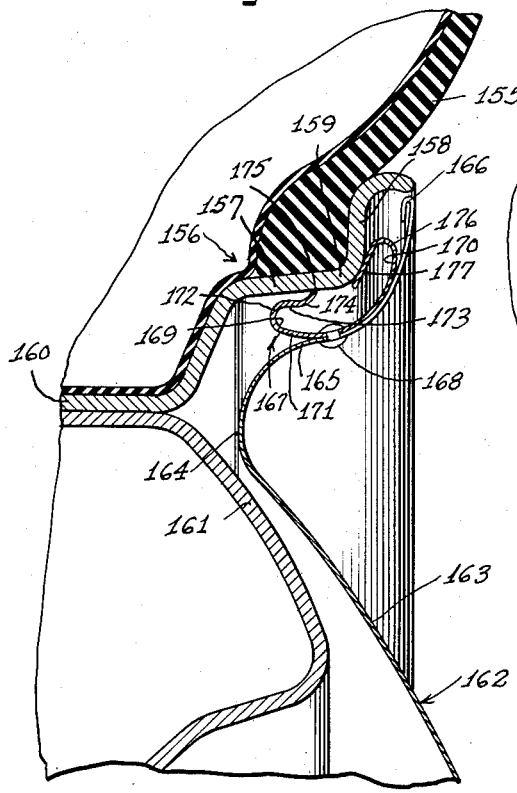
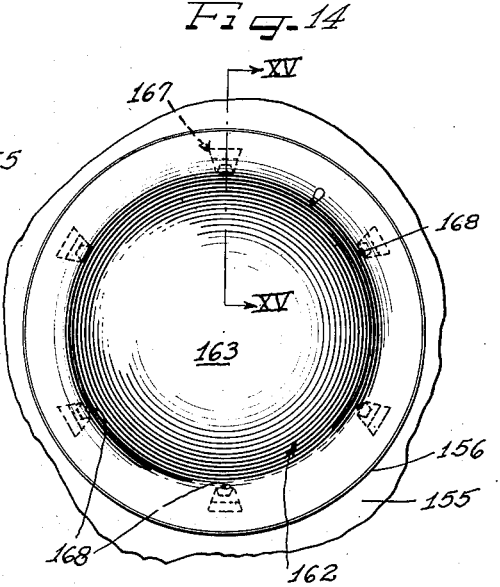
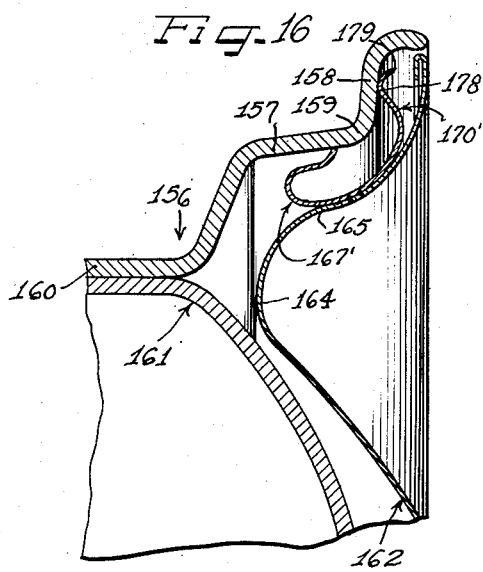
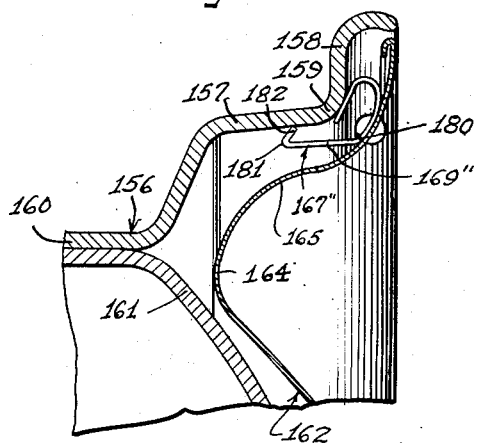
Inventor
GEORGE ALBERT LYON
by Hill, Sherman, Meroni, Gross & Simpson
Attys.

United States Patent Office 2,757,978
Patented Aug. 7, 1956

2,757,978

WHEEL COVER

George Albert Lyon, Detroit, Mich.

Application April 2, 1954, Serial No. 420,533

24 Claims. (Cl. 301—37)

This invention relates to improvements in wheel structures and more particularly relates to the ornamental and protective covering of the outer side of vehicle wheels.

An important object of the present invention is to provide a wheel structure having an improved ornamental and protective outer cover.

Another object of the invention is to provide for disposition at the outer side of a vehicle wheel an improved cover of the self-retaining type.

A further object of the invention is to provide a wheel cover for disposition at the outer side of a vehicle wheel and having improved means thereon for retaining engagement with the tire rim of the wheel.

Still another object of the invention is to provide a wheel cover having improved retaining means at the margin thereof for engagement with the tire rim of a vehicle wheel and which will support the cover in self centering, cushioned relation to the wheel.

Yet another object of the invention is to provide in a vehicle wheel cover improved means for supporting the cover in securely retained spaced relation to the outer side of the associated wheel.

According to the general features of the present invention, there is provided in a wheel structure including a load sustaining body portion and a multi-flange tire rim having a generally axially extending intermediate flange and a terminal flange, a wheel cover for substantially concealing the outer side of the wheel and more especially the tire rim, the wheel cover having on the inside thereof a series of concealed retaining clips each of which includes a portion comprising a retaining finger retainingly engageable with the intermediate flange of the tire rim and a portion engaging the terminal flange to limit the inward disposition of the cover relative to the tire rim.

According to other general features of the invention, the cover comprises a two-ply structure and the clips are secured to the inner ply.

According to further features of the invention, the clips comprise sheet metal strips having the opposite end portions thereof fashioned to provide respectively the retaining fingers and the limiting portions.

According to yet other features of the invention, the retaining clips comprise bowed metal strips intermediately secured to the inner face of the cover and with the opposite end portions providing respectively the retaining fingers and the limiting portions.

Other objects, features and advantages of the present invention will be readily apparent from the following detailed description of certain preferred embodiments thereof taken in conjunction with the accompanying drawings, in which:

Figure 1 is a side elevational view of a vehicle wheel embodying the features of the present invention;

Figure 2 is an enlarged radial sectional view taken substantially on the line II—II of Figure 1;

Figure 3 is a fragmentary radial sectional view through a vehicle wheel and cover assembly showing a modified cover construction;

Figure 4 is a side elevational view of a modified cover;

Figure 5 is a fragmentary radial sectional view taken substantially on the line V—V of Figure 4;

Figure 6 is a fragmentary rear elevational view of the cover of Figure 5 showing one of the retaining clips;

Figure 7 is a developed plan view of one of the spring clips of the cover of Figure 5;

Figure 10 is a fragmentary radial sectional view through a wheel showing a cover of further modified form;

Figure 14 is a side elevational view of a modified cover;

Figure 15 is a fragmentary radial sectional view taken on the line XV—XV of Figure 14;

Figure 16 is a fragmentary radial sectional view illustrating a modified form of the spring clip shown in Figure 15; and Figure 17 is a fragmentary radial sectional view illustrating a still further modification of the spring clips shown in Figure 15.

As shown on the drawings:

Figure 8:
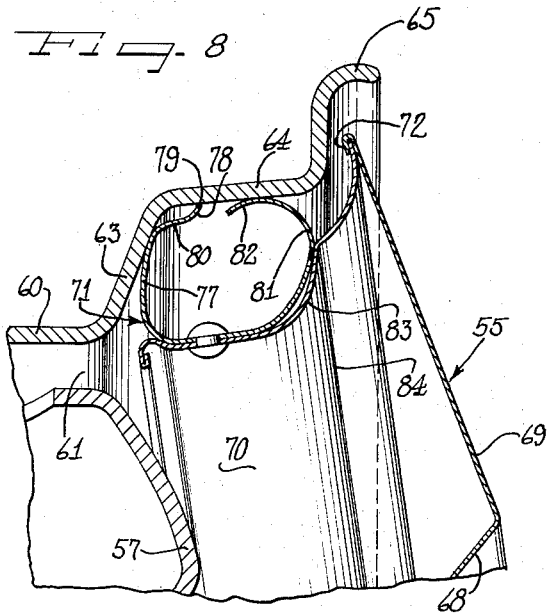
Figure 8 is a fragmentary radial sectional view similar to Figure 5, but showing the cover as it is being applied to the wheel.

A vehicle wheel cover 5 embodying the invention is adapted to be mounted upon and provides an ornamental and protective facing and cover for the outer side of a vehicle wheel such as an automobile wheel comprising a load sustaining body portion 10 which may be appropriately fashioned from a heavy gauge sheet metal including a peripheral attachment flange 11 and a central bolt on flange 12, with an intermediate reinforcing annular outwardly projecting nose bulge 13 strengthening and stiffening the wheel body. A tire rim 14 has a base flange 15 secured in a preferred fashion to the attachment flange 11 of the wheel body and is of the multi-flanged drop center type adapted to support a tire and tube assembly 17. For this purpose the tire rim includes a side flange 18 extending from the base flange 15 and merging with a generally axially extending and somewhat radially outwardly oblique intermediate flange 19 merging on a shoulder 20 with a terminal flange 21 which turns axially outwardly and slightly radially inwardly away from the wall of the tire. Between the annular nose bulge 13 of the wheel body and the intermediate flange 19 of the tire rim is provided a relatively wide and deep axially outwardly opening annular groove.

As shown in Figures 1 and 2, the cover 5 is of the full disk type adapted to substantially cover not only the tire rim 14 but also the wheel body 10. For this purpose, the wheel cover comprises integral central crown and annular trim ring portions 22 and 23, respectively, divergently related from an annular integral generally axially inwardly extending juncture rib 24 which provides an axially outwardly opening annular groove generally simulative of the groove defined between the nose portion 13 of the wheel body and the tire rim intermediate flange 19. In the present instance, the crown portion 22 is of uniformly convex shape but it may have various configurations as desired. The marginal trim portion 23 is of concave-convex cross section generally simulating the curvature of the tire side wall and affording the general appearance of a radially inward extension of the tire side wall. By preference the edge extremity of the trim marginal portion 23 is of a diameter slightly less than the inner edge diameter of the extremity of the terminal flange 21 of the tire rim so that when the cover is concentrically disposed upon the wheel the edge extremity of the cover will lie in slightly spaced relation to the inner corner of the tire terminal flange extremity.

Where it is desired to provide a finish on the cover which can be obtained most effectively or economically in a plastic material or in a relatively expensive thin metal such as brass, the cover may be made of two members or plies as shown, including an outer ply or cap 25 and an inner ply member 27. The cap 25 may be a plastic material of any preferred color or combination of colors or it may be brass, plated and polished, as preferred. On the other hand, the inner ply 27 may be made from a less expensive material such as steel which may be treated for rust and corrosion-proofing in an appropriate manner such as by zinc coating the same. The two plys 25 and 27 are conformed complementary and are secured together in any appropriate fashion as by having the outer margin of the outer cap ply 25 turned inwardly upon itself and lock seamed about the outer edge of the inner ply 27, as indicated at 28.

Means for attaching the cover 5 to the wheel comprise a series of retaining clips 29 which are carried by the inner side of the cover and more particularly the outer marginal trim portion 23 and are retainingly engageable with the tire rim 14. To this end, a uniformly spaced series of the clips is provided, such as six, as indicated in dash outline in Figure 1. Each of the clips is formed from a strip of suitable sheet material, such as an appropriate grade of spring steel, and secured to the inner ply member 27 of the cover.

Each of the clips 29 comprises an intermediate or body portion 30 secured to the inner ply member 27 of the cover as by means of a rivet 31. To accommodate the rivet 31 and also to provide a locating and turn-preventing interlock seat for the clip the inner cover member 27 is provided with an axially inwardly pressed area 32 which may be in the form of an individual embossment for each of the clips or an annular rib extending all around in an intermediate portion of the outer marginal trim area of the inner cover member 27. The intermediate portion 30 of the clip is formed with a complementary interlock shoulder 33 which nests with the shouldered embossment 32 and thus retains the clip against turning out of operative position.

The inner end portion of the clip 29 is turned away from the back of the cover and comprises a resilient terminal finger portion 34 extending generally radially and axially outwardly and adapted to engage at its tip with the inner face of the intermediate flange 19 of the tire rim for retaining the cover on the wheel. Thus, the clips 29 are disposed equidistantly spaced circularly on the inner side of the trim ring margin of the cover with the tips of the retaining fingers 34 of the clips normally extending to a greater diameter than the diameter of the inner face of the intermediate flange 19 of the tire rim. This condition is represented in dash outline in Figure 2.

In applying the cover it is generally centered with the outer face of the wheel and then pushed axially inwardly so that the retaining fingers 34 of the clips bear against the inner face of the intermediate flange 19 and cam inwardly thereon, being flexed inwardly and axially outwardly to accommodate to the gradually diminishing diameter of the intermediate flange and being thus placed under gradually increasing resilient tension as the cover is pushed home. Hence, the retaining fingers 34 engage with tensioned, wedging retaining force at their tips against the intermediate flange of the rim and have a self-centering effect due to the individual flexing of each of the retaining fingers 34 and the symmetrical disposition of the clips so that each of the clips engages with maximum efficiency and with substantially uniform tension against the tire rim flange 19.

It is desirable for several reasons to maintain the cover in spaced relation to the outer side of the wheel. Among these reasons may be mentioned that in this manner the cover is entirely independent of any manufacturing tolerances between the wheel body 10 and the tire rim 14. Thereby, also, the cover is held against axial vibration while in service. Moreover, by maintaining the outer margin of the cover clear of the tire rim both at the inner side of the cover margin and at its edge, ventilation opening is afforded and also a passage for the centrifugal expulsion of dirt that may for any reason get behind the cover. To this end, the outer end portions of the clips 29 are formed with stop means, herein in the form of return bent limit or stop fingers 35. These stop fingers 35 are of sufficient length to engage at their axially inner side against the terminal flange 21 of the tire rim and preferably at or adjacent to the shoulder 20 near the juncture of the terminal flange with the intermediate flange 19. Adjacent to the return bend by which the limit finger is provided, the body of the clip is preferably divergently related to the adjacent inner face of the cover, as indicated at 37, so as to enhance the resilient, cushioning effect of the limit fingers or flanges. Thus, excess pressure against the outer side of the cover will not tend to overstress the limit fingers and in applying the cover the resistance afforded by the limit fingers 35 when the cover is fully mounted will become apparent before the fingers are overstressed, where reasonable care is exercised in applying the cover. This enhanced resiliency feature is also valuable in resisting damage to the springs and to the cover from curbing or other inward pressure against the cover so that the cover is protected by the springs serving as cushions therefor.

By having the stop or limit flanges or fingers 35 of the clips extending generally diagonally radially and axially inwardly, as shown, both radially outward and axially inward components of cushioning tension are applied thereby to the shoulder 20. This results in resisting not only axial flutter or excessive vibration of the cover but also excessive radial displacement vibrations or chattering as may occur under severe or rough road conditions in service.

In a more economical form as shown in the modification of Figure 3, a cover 40 is provided which comprises a single sheet of material such as steel or the like which may be polished or plated or enameled on the outer surface and is formed with a crown portion 41 and a trim ring outer marginal portion 42 joined together in generally divergent relation by an integral axially inwardly projecting juncture rib 43 defining therebetween a relatively large outwardly opening annular groove corresponding generally to the groove between the tire rim intermediate flange 19 and the nose portion 13 of the wheel body and into which groove the rib 43 extends in spaced relation. The crown portion 41 is of a preferred configuration and may be of convex form while the trim margin 42 may be of generally convex cross section and has the outer edge turned under to provide a reinforcing flange 44 and a finished edge for the cover. The diameter of the cover edge is less than the diameter of the inner corner of the terminal flange extremity of the tire rim so that a gap will be left similarly as with the cover 5.

For retaining the cover 40 on the wheel in self-centering, cushioned relation, a series of spring clips 45 is carried by the inner face of the trim portion 42 of the cover in a symmetrical series similarly as the clips 29 of the cover 5. However, the clips 45 are made from appropriate strip material such as spring steel of proper grade and each clip has an intermediate loop or body portion 47 which is secured to the inner face of the cover portion 42 as by welding the same thereto, any welding marks being polished off on the outer face of the cover. At its inner end, the clip 45 is formed with a generally return bent axially outwardly and radially outwardly extending retaining finger 48 which is retainingly engageable with the inner face of the tire rim intermediate flange 19 by effecting a resilient, tensioned, wedging retaining gripping engagement with the tire rim flange. In order to relieve the weld juncture from strain and also to afford an assembly location for the clips, the cover is provided with an annular shoulder 49 substantially at juncture of the trim portion 42 of the cover with the juncture rib portion 43 receptive of a shoulder 50 on the clip adjacent to the juncture of the retaining finger 48 with the body of the clip.

At the opposite or outer end, the clip 45 is formed with a resilient limit finger structure 51 which may comprise a generally axially rearwardly and radially outwardly extending terminal portion of the clip body and which curves generally radially and axially outwardly to provide a curved engagement terminal pad 52. As indicated at 53 the clip body 47 is directed divergently away from the cover portion 42 adjacent to the limit finger 51 so as to afford a substantial range of flexure for the finger without placing the same under undue stress.

In applying the cover 40, the same procedure is followed as explained in connection with the cover 5, namely the cover is generally centered with respect to the outer side of the wheel and pushed inwardly, the retaining fingers 48 effecting retaining engagement with and being placed under retaining stress by the engagement with the intermediate flange 19 of the tire rim. When the limit finger 51, and more particularly the engagement pad 52 thereof, engages the terminal flange 21, the cover is held in spaced relation outwardly from the tire rim and also the wheel body.

In the modification of Figures 4-9 is a cover 55 adapted for application to the outer side of a vehicle wheel comprising a wheel body 57 and a tire rim 58. The wheel body has a marginal axially inwardly extending flange 59 which is attached in suitable manner to a base flange 60 on the tire rim. At intervals the marginal flange 59 is inset to provide the ventilation openings 61 between the wheel body and the tire rim.

The tire rim 58 is of the multi-flanged drop center type adapted for supporting a pneumatic tire and tube assembly 62, and includes a side flange 63, an intermediate and generally axially and radially outwardly oblique flange 64 and a terminal flange 65.

In the present instance the cover 55 includes a deeply inset crown portion 67, an axially outwardly and radially outwardly oblique intermediate portion 68 and a generally radially outwardly and axially inwardly oblique marginal portion 69, the cover being of the full disk type adapted to be made from a single sheet of material and having a diameter to cover the wheel body and substantially all of the tire rim.

For retaining the cover 55 on the wheel, self attaching means are provided comprising an annular ring flange 70 and a series of the cover retaining clips 71 carried by the ring flange. The flange ring 70 has a generally radially extending flange engaging behind the outer peripheral portion of the marginal section 69 of the cover and secured in place by means of an underturned outer marginal reinforcing and finishing flange 72. From the point of attachment, the ring member 70 extends arcuately generally radially and axially inwardly to extend substantially down into the substantial groove provided between the wheel body 57 and the tire rim 58 and in radially inwardly spaced relation to the intermediate flange 64. At its inner terminus, the flange ring 70 is provided with a generally radially inwardly extending and returned bent reinforcing and finishing flange 73.

Figure 9:
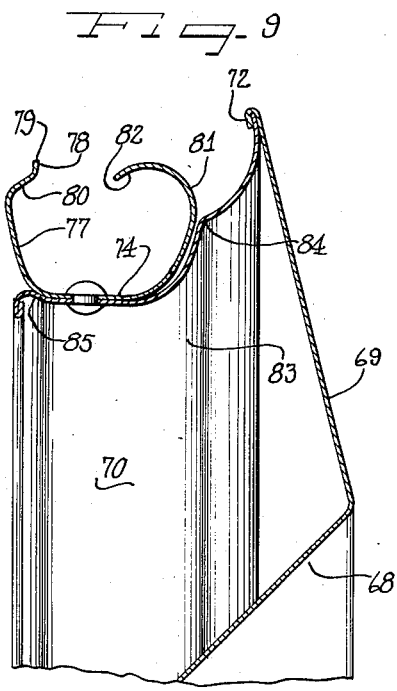
Figure 9 is a fragmentary radial sectional view similar to Figure 5, but showing the cover before application to the wheel.

The retaining fingers 71 are preferably so constructed and arranged that they can be carried by the radially outer side of the axially inner portion of the ringe flange 70 for cover retaining engagement with the intermediate flange 64 of the tire rim. To this end, the clips 71 comprise a body loop portion 74 which is adapted to be secured in suitable fashion as by means of a rivet 75 to the flange ring 70. Extending generally axially and radially from the axially inner portion of the body loop 74 is a resilient retaining leg 77. As best seen in Figure 9, the leg 77 in the normal condition of the clip before assembly of the cover with the wheel extends fairly straight and generally radially and axially inwardly. At its distal end portion, the retaining leg 77 has a short stiff axially outwardly extending retaining terminal flange providing a retaining tip 79 and joined to the body portion of the leg 77 by an angular generally axially and radially outwardly extending short stiffening flange 80. It will be observed that juncture of the leg 77 with the body 74, and juncture of the intermediate connecting and stiffening flange 80 with the body of the leg 77 and with the terminal flange leg 78 are all formed on respective radii so as to avoid concentration of flexure stresses at the junctures. It will also be observed that the body of leg 77 is of substantial length so as to be capable of substantial resilient flexure. In the normal extended condition of the leg 77, the tip 79 projects to a greater diameter than the inside diameter of the intermediate flange 64 of the tire rim, and particularly to a greater diameter than the inner portion of the inside face of the intermediate flange.

In applying the cover to the wheel, the procedure illustrated in Figure 8 is followed. Thus, the cover is moved in tilted relation toward the wheel and the shoulder adjacent juncture of the connecting flange 80 with the leg 77 bears against the side flange 63 of the tire rim while the tip 79 engages against the inner portion of the intermediate flange 64. The cover is then levered inwardly so that the remaining clips cam inwardly along the intermediate flange 64 and the entire series of clips is placed under resilient radially inward tension. As an incident to the levering of the cover 55 inwardly until it assumes a substantially concentric relation to the wheel, the tip 79 of the clip or clips which are initially brought into engagement with the tire rim as shown in Figure 8, shift axially outwardly along the tire rim intermediate flange 64 as a result of the short leverage fulcruming at the shoulder of the clips engaging the side flange 63 and acting through the relatively short and stiff connecting flange 80 and the terminal flange 78, until the tips 79 of the initially engaging clips assume a rim flange gripping position, which is on substantially a uniform annular line with the tips 79 of all of the other clips 71 on the cover. As the clips are placed under resilient gripping tension against the intermediate flange 64, the elongated body portion of the clip leg 77 bows inwardly substantially as shown in Figures 5 and 8 and thus substantial gripping force is exerted radially outwardly against the intermediate flange 64 by the clip tips 79. In the final assembled relation of the cover to the wheel, the axially directed shoulders provided by the outer end portions of the clip leg body portion 77 may engage the side flange 63, or they may spring into slightly spaced relation to the side flange as shown in Figure 5. In any event, initial engagement of the clip legs 77 with the side flange 63 determines the axially inward limit of assembly movement of the cover relative to the wheel.

In order to relieve the retaining clip legs 77 of undue stress which might result from severe radially imposed forces acting on the wheel as a result of jarring or hitting bumps or the like in service, and thus avoid undesirable range of radial vibration, the clips 71 are provided with cushioning means, herein comprising respective cushioning loops 81 provided at the opposite ends of the clips from the retaining legs 77. The cushioning loops are provided with respective distal end shoulder portions 82 which are on a normal diameter slightly greater than the inside diameter of the outer portion of the intermediate flange 64 of the tire rim, and so that when the cover is applied to the wheel, the shoulder loops 82 will engage in resilient stressed relation against the intermediate flange. As a result, the cushioning leg portion 81 of the clips cooperate with the retaining leg portions 77 to afford substantial radial stability for the cover but nevertheless a resilient, cushioned relation which permits limited floating movement of the cover without undesirable amplitude of radial vibration.

In order to assist in pushing the clips home into engaged relation with the tire rim, and more particularly to assist in pushing the vibration damping and the cushioning leg portions 81 into position on the wheel, the ring flange 70 is provided with a shoulder 83 overlying the loop portion 81 in normally axially outwardly slightly spaced relation thereto as shown in Figure 9, but engageable with the cushioning legs during press on of the cover, substantially as shown in Figure 8 as an incident to resilient flexure of the cushioning legs of the clips due to resistance to inward sliding tensioning movement of the clip and shoulders 82 along the intermediate flange 64. After the cover is on the wheel, tensioning of the clips causes the shoulder 83 to move into slightly spaced relation to the cushioning legs 81, as shown in Figure 5.

To remove the cover from the wheel, a pry off tool such as a screwdriver is inserted between the tire rim and the outer margin of the cover and axially outward leverage applied to the cover margin to dislodge the retaining clips 71 from the tire rim intermediate flange 64. Pry off is facilitated by provision of a pry off rib 84 at juncture of the shoulder portion 83 of the ring 70 with the radially outer arcuate marginal portion of the ring member. The rib 84 substantially reinforces and stiffens the ring member and provides a leverage point spaced substantially axially inwardly from the outer reinforced edge of the cover.

In order to distribute the bending strain on the inner portion of the retaining legs 77 of the clip during pry off, the inner marginal portion of the ring member 70 is preferably formed with an arcuate backup shoulder 85 opposing the clip leg portion. As shown, the shoulder 85 may be of a generally ogee shape.

As will be observed from Figure 7, the clips 71 are preferably formed substantially wider in the body portion 74 thereof and tapering in the respective leg portions 77 and 81. This affords substantial lateral stability in the clips which are preferably made from suitable gauge spring steel stock. Moreover, by virtue of having the portions of the legs 77 and 81 adjacent the wide body 74 of progressively increasing width, the legs are of correspondingly progressively greater resilience from their tips to their proximal end portions.

In the modification of Figure 10, a cover 95 is applied to a wheel substantially the same as the wheel of Figure 5 and therefore similar reference numerals are applied in identifying the components of the wheel. The cover 95 comprises an outer cover plate or body of any preferred contour including an outer marginal portion 97 which may be similar to the corresponding portion of the cover 55 hereinabove described.

Cover retaining means are carried by the marginal portion 97 of the cover. To this end, a ring flange member 98 is secured to the cover margin by attachment of a radially outwardly extending axially outer marginal flange 99 behind the margin of the cover by means of an underturned reinforcing end attachment flange 100. The flange member 98 extends radially and axially inwardly in spaced relation past the intermediate flange 64 and has a generally radially inwardly projecting annular inner portion 101 facing toward the intermediate flange 64 of the tire rim in the assembly and carrying a suitable series of cover retaining spring clips 102.

Each of the clips 102 compirses a body portion 103 secured as by means of a rivet 104 to the supporting ring portion 101 and merging on a radius with a retaining leg 105. The retaining leg has a short and stiff tire rim terminal engaging flange 107 joined thereto by an angular juncture flange 108. To this extent the clips 102 are substantially the same and function substantially the same as the retaining leg portions of the clips 71 hereinabove described.

The opposite end portions of the clips 102 are in the form of cushioning legs 109. These legs extend radially outwardly behind a backup shoulder 110 having the same relation to the legs 109 as the backup shoulder 83 has to cushioning legs 81 of the hereinabove described form of the clips. The terminal end portions of the cushioning legs 109 are respectively provided with an angular, reentrantly shaped engagement shoulder portion 111 adapted to engage nestingly with the juncture shoulder between the intermediate flange 64 and the terminal flange 65 of the tire rim in the assembled relation of the cover with the wheel. Thereby, the cover 95 is held by the resiliently flexible legs 109 of the clips, not only against undesirable radial amplitudes of vibration, but also against undesirable radial amplitudes of vibration in service.

Application of the cover 95 to the wheel is accomplished in the same manner as application of the cover 55. During application, the axially outer shoulder portions of the clip legs 105 engage against the side flange 63 of the tire rim adjacent to the juncture of such side flange with the intermediate flange 64 and the short leverage afforded by the relatively stiff connecting flange 108 and the stiff short terminal flange 107 of the clips 102 first engaged with the tire rim fulcrums the retaining tips of the terminal flanges 107 axially outwardly along the intermediate flange 64 into a circular alignment with the tips of the remaining retaining clips in the fully assembled relation of the cover with the wheel. During the press on of the cover, furthermore, the shoulder 110 of the retaining ring member 98 presses against the cushioning legs 109 of the clips.

Pry off of the cover is facilitated by the provision of a pry off and reinforcing rib 112 at juncture of the ring shoulder 110 with the outer portion of the ring member.

During the pry off, the inner portion of the clip leg 105 is stress relieved by the opposing shoulder provided by an axially inwardly and radially outwardly directed inner reinforcing terminal flange 113 on the ring member 98.

Figure 11:
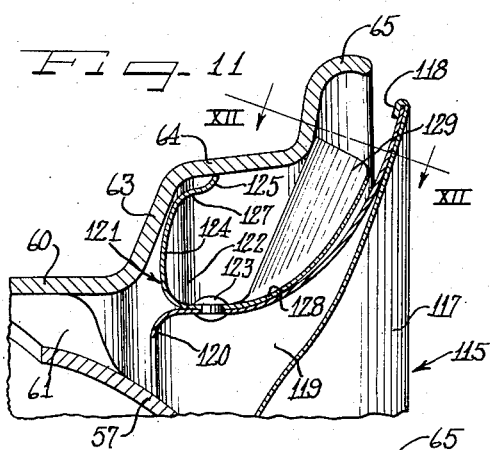
Figure 11 is a fragmentary radial sectional view through a wheel showing still another modified form of cover.
Figure 12:
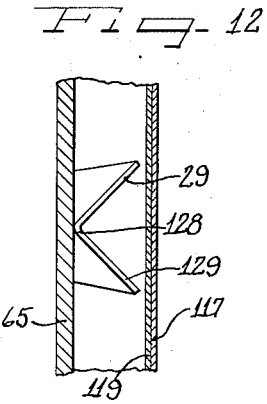
Figure 12 is a fragmentary detail sectional view taken substantially on the line XII—XII of Figure 11.

In the further modification of Figure 11, a cover 115 is applied to a wheel which is similar to the wheel of Figure 5 and similar reference numerals therefore have been applied to the corresponding parts of the wheel. The cover 115 comprises a cover body 117 having an underturned outer marginal flange 118 which secures in place the radially and axially outer margin of a retaining flange ring member 119. The ring member 119 extends in a radially and axially inward direction from the point of attachment and terminates in a generally radially inwardly extending annular reinforcing flange 120.

A series of cover retaining clips 121 is carried by the flange member 119 for engagement retainingly with the tire rim. Each of the clips 121 comprises a body portion 122 secured as by means of a rivet 123 to the radially outwardly facing inner portion of the ring member 119. A retaining leg 124 of each of the clips includes a short stiff terminal flange 125 which engages retainingly against the intermediate flange 64 of the tire rim, while a short, stiff, angular connecting flange 127 secures the terminal flange to the body portion of the retaining leg 124. The functioning and structure of the clip legs 124 is substantially the same as the clip legs 77 hereinabove described.

Each of the clips 121 has means thereon for cushioning the cover and in addition for promoting air circulation through the wheel behind the cover. To this end, a cushioning leg extension 128 is provided on the clips 121. Each of the legs 128 is of a length to engage in the assembly with the terminal flange 65 adjacent juncture thereof with intermediate flange 64. Moreover, each of the cushioning legs 128 is longitudinally bent to provide a pair of divergently extending wings 129. These wings 129 extend in the space between the outer margin of the cover and the tire rim so that in the rotation of the wheel in service, air entering behind the wheel through the gap at the outer margin of the wheel and the terminal ring 65 will be impelled by the respective wings 129 acting as impeller vanes inwardly to pass through the wheel openings 61 for cooling a brake drum behind the wheel and to which the wheel is attached in the well known manner. It will be observed that the outer edges of the wings 129 normally lie in slightly spaced relation to the adjacent face of the ring member 119 to implement the floating relation of the cover maintained by the clips, but that during application of the cover to the wheel, the leg members 128 may flex until the opposing edges of the wing members 129 engage the retaining ring member 119, but by springing of the clip members will separate from the contacting engagement with the ring member in the fully assembled relation of the cover with the wheel.

Figure 13:
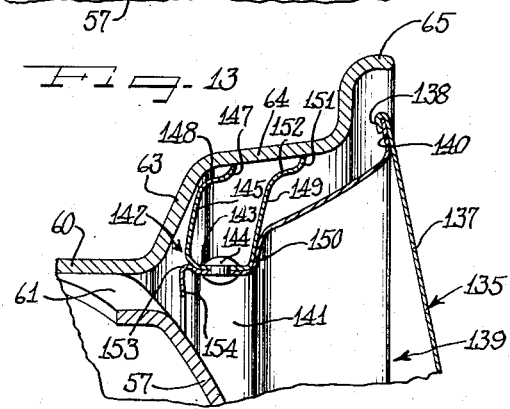
Figure 13 is a radial sectional view through a wheel showing yet another modification.

In the modification of Figure 13, again, the wheel is substantially the same as in Figures 5, 10 and 11 and, therefore, similar reference numerals designate the identical parts. In this modification, a wheel cover 135 is applied to the wheel and comprises a wheel body 137 having an outer marginal underturned reinforcing flange 138 securing behind the outer margin of the cover body a retaining ring member 139 provided with a radially outwardly extending outer marginal flange 140 which is secured in place by the underturned marginal flange 138. From the flange 140, the retaining ring member 139 extends generally radially and axially inwardly to lie in radially inwardly spaced relation to the intermediate flange 64. An inner marginal radially inwardly recessed portion 141 on the retaining ring member cradles an annular series of retaining clips 142. Each of the retaining clips has a body portion 143 secured as by means of a rivet 144 to the radially outwardly facing surface of the ring portion 141. The inner portion of each of the clips 143 comprises a generally radially outwardly extending leg 145 having a stiff recessed terminal structure including a terminal flange 147 and an angular connecting flange 148. The general construction and functioning of the retaining leg 145 of the clips is substantially like that of the clip 71 of Figure 5. However, in the present instance, the clips 142 may be made from substantially thinner resilient spring steel stock.

The opposite end portions of the clips 142 are provided with cushioning legs 149 which in the present instance by reason of the use of thin spring steel stock for the clips are also operative to assist the retaining legs 145 of the clips in retaining the cover on the wheel. To this end, the cushioning legs 149 are constructed to extend generally radially and axially outwardly, backed up by a shoulder 150 on the intermediate portion of the ring member 139, and short and stiff retaining terminal flanges 151 are provided on the cushioning legs to engage in wedging, retaining relation against the axially outer portion of the inner face of the intermediate flange 64. The retaining end portions of the legs 149 are formed in recessed configurations similarly as the retaining portions of the retaining legs 145, with a short and stiff angular connecting flange 152 between the terminal flange 151 and the body of the leg member 149. It will be observed that the cushioning leg members 149 are somewhat longer than the retaining leg portions 145, since it is desirable to have the cushioning legs somewhat more flexible than the retaining legs.

Application and removal of the cover 135 with respect to the wheel is substantially the same as described in connection with the foregoing forms of the invention and especially the form in Figure 5. Pry off is effected by inserting a screwdriver or like pry off tool behind the outer edge of the cover for prying same free from the wheel. A flexure backup for the retaining legs 145 of the clips is afforded by a rib-like radially outwardly projecting annular formation 153 on the inner terminal portion of the retaining ring 139 and from which extends radially inwardly a finishing and reinforcing flange 154.

In Figures 15, 16 and 17, I have shown a conventional type of automobile tire and wheel assembly to which the cover of my invention, which may be any one of the three modified forms shown in Figures 15, 16 and 17, can be applied.

The reference character 155 designates generally a pneumatic tire and tube assembly supported in the conventional way upon a multi-flange drop center type of tire rim 156 which includes an axially extending inclined flange 157 joined to a radially extending terminal flange 158 by a junction shoulder 159. The flanges 157 and 158 cooperate to support the beads of the tire in a conventional manner.

The ring also includes a base flange 160 attached to a load sustaining or wheel body member 161 at spaced intervals in a manner well known to those familiar with this art. The central part of the body 161 is depressed to define an insert apertured bolt-on flange (not shown) by means of which the wheel can be detachably supported on an axle of the automobile.

Cooperable with this standard type of wheel assembly is a wheel cover, designated generally by the reference character 162, which may be made of any suitable sheet material. Excellent results are attainable by the stamping of the cover 162 from sheet metal such, for example, as stainless steel sheet and the like.

The cover 162 includes a central crown or hub portion 163 joined by a dished portion 164 to a divergent portion 165 terminating in a turned pry off edge 166. The portions 163 and 164 and 165 of the cover are cross sectionally contoured so as to extend axially and radially inside of the rim flanges 157 and 158.

Attached to the rear or concealed side of the cover portion 165 are a plurality of sets of cover retaining means or clips 167, each of which may be riveted or otherwise secured at 168 to portion 165. These clips 167 may be of any suitable number, such, for example, as six, as shown in Figure 14, and are circumferentially spaced about the axis of the cover and wheel.

Each clip or set of fingers 167 includes a turned retaining finger 169 and a cushioning finger 170 integrally connected by a resiliently yieldable intermediate bend or junction portion 171 engaged by the rivet 168. The turned finger 169 has a bend 172 leading into a slightly indented or inclined leg 173 terminating in an angled extremity 174 having a biting or gripping edge 175 for engagement with the inclined surface of axial rim flange 157. This finger 169 is of such resilient character that the leg 173 can yield as the relatively short, stiff inclined terminal 174 cammingly engages rim flange 157.

In other words, the edges 175 of the fingers 169 are normally in a circle of a diameter slightly less than that of the opening defined by rim flange 157 so that the fingers are cammed radially inwardly upon their engagement with rim flange 157.

The cushioning and centering finger 170 includes a turned portion 176 having a turned back end 177 for bottoming against the radial flange 158 at the rim flange shoulder or junction 159.

In the application of the wheel cover 162 to the wheel, it is first aligned with the opening defined by the rim and is then pressed axially into the wheel. As it is moved into the wheel the inclined spring terminals 174 cammingly engage the surface of axial rim flange 157. Contemporaneous therewith the flattened ends 177 of the cushioning springs 170 contact the rim flange 158 and shoulder 159 to assist in centering the cover on the wheel and to serve as a cushioning means.

It will also be perceived that the two fingers 169 and 170 of each set comprising a single clip 167 are disposed substantially on opposite sides of the rim flange shoulder 159 so that the forces applied by the clip are applied to the rim on opposite sides of the shoulder 159.

In Figure 16 I have shown a modification of the invention wherein the only difference from the previously described modification of Figure 15 is in the construction of the cushioning and centering finger 170' of each clip 167'. In this instance, the cushioning finger 170' is turned slightly outwardly at 178 and terminates in a free edge 179. The turned portion 178 of each finger 170' is adapted to bottom against the radial flange 158 in the centering and cushioning of the cover on the wheel. With the foregoing exception, this form of the invention is substantially identical to that shown in Figures 14 and 15, and parts common to both forms are designated by the same reference numerals in Figure 16.

In Figure 17 I have shown a further modification of the invention wherein the only difference is in the construction of the retaining finger 169" of each clip 167". In this form, the retaining finger 169" is turned outward at 180 and extends generally axially in a relatively straight projection, whence, at junction 181, the retaining finger 169" terminates in a relatively short stiff generally obliquely extending free edge 182. This edge portion 182 is adapted to engage against the axial rim flange 157 upon engaging of the cover 162 on the wheel. With the foregoing exception, this form of the invention is substantially identical to that shown in Figures 14 and 15, and parts common to both forms are designated by the same reference numerals in Figure 17.

It should also be noted that the divergent portion 165 is dished a substantial distance into the hollow defined by the wheel rim base flange 157 and that the spring retaining means are mounted on this portion 165 also substantially within the confines of the base flange. This results in the spring portions 169 of the clip being substantially wholly within the base flange with each of the angular extremities 174 at such an acute angle as to exert effectively a retaining force against the rim flange. Moreover, the location of each extremity 174 substantially forward of the bend 172 of the spring portion 169 prevents the spring from turning inside out in the removal of the cover from the wheel.

It will be apparent that in all forms of the cover, it is effectively retained in self-centering, resiliently floating, cushioned and yet effectively retained relation upon the wheel. The cover is especially resistant to damage from external pressure since it can yield and thus give in response to such pressure as permitted by the retaining clips. Adequate ventilation as well as evacuation of dirt from behind the cover is afforded due to the spaced relation of the outer margin of the cover with respect to the tire rim. The gap between the edge of the cover and the terminal flange 21 is also advantageous in accommodating wheel balancing weights in protected, concealed relation.

With respect to any of the forms of the cover shown, removal of the cover can be easily effected by applying a pryoff tool such as a screwdriver or the like between the outer edge of the cover and the terminal flanges 21 or 65 of the tire rim as permitted by the gap between the edge of the cover and the terminal flange. The terminal flange then affords an effective pry off fulcrum ridge. Since the spring clips are resilient, they will yield to some extent radially away from the pry off force and thus gradually relinquish their retaining grip upon the tire rim until the cover is released after pry off force has been exerted successively to a series of points spaced annularly about the cover edge. Such pry off is effective without in anywise damaging the clips, the cover or the tire rim so that the cover can be replaced efficiently.

The present application constitutes a consolidation and continuation-in-part of the disclosures contained in:

(1) My parent application Serial No. 72,977, filed January 26, 1949 (abandoned);
(2) My pending application Serial No. 303,535, filed August 9, 1952 abandoned;
(3) My co-pending application Serial No. 381,827, filed September 23, 1953 abandoned; and
(4) Disclosures of the present application not specifically referred to in (1), (2) or (3).

It will be understood that modifications and variations may be effected without departing from the scope of the concepts of the present invention.

I claim as my invention:

1. In a wheel structure including a load-sustaining body portion and a multi-flange tire rim having a generally axially extending intermediate flange and a terminal flange, a wheel cover for substantially concealing the outer side of the wheel and more especially the tire rim, the wheel cover having on the inside thereof a series of concealed retaining clips each of which includes a portion comprising a retaining finger retainingly engageable with the intermediate flange of the tire rim and a portion engaging the terminal flange to limit the inward disposition of the cover relative to the tire rim, the clips comprising sheet metal strips having the opposite end portions thereof fashioned to provide respectively the retaining fingers and the limiting portions.

2. In a wheel structure including a load-sustaining body portion and a multi-flange tire rim having a generally axially extending intermediate flange and a terminal flange, a wheel cover for substantially concealing the outer side of the wheel and more especially the tire rim, the wheel cover having on the inside thereof a series of concealed retaining clips each of which includes a portion comprising a retaining finger retainingly engageable with the intermediate flange of the tire rim and a portion engaging the terminal flange to limit the inward disposition of the cover relative to the tire rim, the retaining clips comprising bowed metal strips intermediately welded onto the inner face of the cover and with the opposite end portions providing respectively the retaining fingers and the limiting portions.

3. In a wheel cover for disposition at the outer side of a vehicle wheel including a multi-flange tire rim, a retaining structure including a body portion secured against the inner face of the cover, a generally axially inward portion comprising a retaining finger, adapted to engage the intermediate flange of the tire rim, and an outer portion comprising a limit finger extending axially inwardly from the adjacent area of the cover and adapted to engage the terminal flange portion of the tire rim for limiting axially inward disposition of the cover, the cover and the body portion of the retaining structure having internested locating shoulders.

4. In a wheel structure including a wheel body and a tire rim, a cover for substantially covering the outer side of the wheel body and the tire rim including a series of retaining and cushioned clips carried in concealed relation by the inner side of the rim-covering portion of the cover, each clip comprising an intermediate body portion secured to the cover, an axially inner tire rim engaging and cover retaining end portion and an axially outer tire rim engaging and cushioning end portion holding the cover in spaced cushioned relation to the tire rim.

5. In a cover for disposition at the outer side of a vehicle wheel, a cover body of a size to substantially cover a tire rim on the wheel, and cover retaining clip means behind the radially outer marginal portion of the cover, said clip means being separately formed from the cover body and having means attaching the same to the cover spaced radially inwardly and free from the outer area of said marginal portion of the cover, said clip means comprising retaining fingers engageable with the tire rim for retaining the cover on the wheel and a set of fingers disposed between the retaining fingers and said outer edge area and adapted for engagement against the tire rim to maintain the outer marginal portion of the cover in predetermined spaced relation to the tire rim.

6. In a cover for disposition at the outer side of a wheel having a tire rim, a member behind the outer margin of the cover having retaining clips thereon comprising axially inner and axially outer leg portions for respectively tire rim retaining and cushioning engagement, said member behind the cover margin comprising a substantially rigid ring extending generally axially inwardly and having the clips secured to the radially outer side thereof.

7. In a cover for disposition at the outer side of a wheel having a tire rim, a member behind the outer margin of the cover having retaining clips thereon comprising axially inner and axially outer leg portions for respectively tire rim retaining and cushioning engagement, said member behind the cover margin comprising a substantially rigid ring extending generally axially inwardly and having the clips secured to the radially outer side thereof, said clips comprising a spring loop intermediately secured to said ring and with the axially inner and outer clip leg portions comprising oposite end portions of the spring loop.

8. In a cover for disposition at the outer side of a wheel having a tire rim, a member behind the outer margin of the cover having retaining clips thereon comprising axially inner and axially outer leg portions for respectively tire rim retaining and cushioning engagement, said member behind the cover margin comprising a substantially rigid ring extending generally axially inwardly and having the clips secured to the radially outer side thereof, said clips comprising a spring loop intermediately secured to said ring and with the axially inner and outer clip leg portions comprising opposite end portions of the spring loop, the ring having a shoulder engageably opposing the axially outer leg portions of the clips.

9. In a cover for disposition at the outer side of a wheel having a tire rim, a member behind the outer margin of the cover having retaining clips thereon comprising axially inner and axially outer leg portions for respectively tire rim retaining and cushioning engagement, said member behind the cover margin comprising a substantially rigid ring extending generally axially inwardly and having the clips secured to the radially outer side thereof, said clips comprising a spring loop intermediately secured to said ring and with the axially inner and outer clip leg portions comprising opposite end portions of the spring loop, the outer spring loop having a turned back terminal shoulder portion facing generally radially outwardly for butting against a radially inwardly facing portion of a tire rim.

10. In a cover for disposition at the outer side of a wheel having a tire rim, a member behind the outer margin of the cover having retaining clips thereon comprising axially inner and axially outer leg portions for respectively tire rim retaining and cushioning engagement, said member behind the cover margin comprising a substantially rigid ring extending generally axially inwardly and having the clips secured to the radially outer side thereof, said clips comprising a spring loop intermediately secured to said ring and with the axially inner and outer clip leg portions comprising opposite end portions of the spring loop, said outer leg portion of the clips comprising recessed angular formation for engaging in radially outward thrust relation against a portion of a tire rim.

11. In a cover for disposition at the outer side of a wheel having a tire rim, a member behind the outer margin of the cover having retaining clips thereon comprising axially inner and axially outer leg portions for respectively tire rim retaining and cushioning engagement, said member behind the cover margin comprising a substantially rigid ring extending generally axially inwardly and having the clips secured to the radially outer side thereof, said clips comprising a spring loop intermediately secured to said ring and with the axially inner and outer clip leg portions comprising opposite end portions of the spring loop, said outer clip legs comprising air circulation promoting vanes.

12. In a cover for disposition at the outer side of a vehicle wheel, a cover body, said cover body having attached therebehind a series of cover retaining clips comprising generally looped resilient strips having intermediate portions thereof secured to the cover and having opposite resilient leg portions disposed in generally opposed spaced relation and both engageable with a portion of a wheel, one of said legs having an angularly flanged terminal portion providing a substantially stiff terminus on said leg while the remainder of such leg is resiliently flexible.

13. In a cover for disposition at the outer side of a vehicle wheel, a cover body structure having secured behind a margin thereof a series of spring retaining clips comprising a body portion fixedly secured to the cover and a retaining leg portion joined to the body portion on a radius juncture and projecting flexibly substantially therefrom and having a cover retaining terminal portion engageable with a portion of a wheel for retaining the cover thereon, the cover having a shoulder adjacent to said juncture for flexure stress relief engagement by said juncture during the flexure of the spring clip leg generally toward the shoulder.

14. The wheel structure of claim 1 further characterized by the retaining finger also including a turned portion having an inclined extremity for cover retaining engagement with the intermediate rim flange.

15. The structure of claim 1 further characterized by the retaining finger having a rearward bend in engagement with a rim flange and an outwardly inclined angled extremity extending radially into cover retaining engagement with said intermediate flange.

16. In a wheel structure including a flanged tire rim having generally axial and radial flanges, a circular wheel cover contoured cross sectionally to extend axially and radially inside said rim flanges and spaced concealed sets of cover retaining spring fingers on the rearside of said cover and extending rearwardly therefrom, each of said sets of fingers including a turned resilient portion having a bend and a radially outer relatively short stiff angled extremity terminating in an edge for sliding and gripping engagement with the axial rim flange and also having an opposite bend portion with a resilient free end for cushioning and cover centering engagement with said radial rim flange adjacent said axial rim flange.

17. In a wheel structure including a flanged tire rim having generally axial and radial flanges, a circular wheel cover contoured cross sectionally to extend axially and radially inside said rim flanges and spaced concealed sets of cover retaining spring fingers on the rearside of said cover and extending rearwardly therefrom, each of said sets of fingers including a turned resilient portion having a bend and a radially outer relatively short stiff angled extremity terminating in an edge for sliding and gripping engagement with the axial rim flange and also having an opposite bend portion with a resilient free end for cushioning and cover centering engagement with said radial rim flange adjacent said axial rim flange, said spring finger portions being interconnected by an underturned portion connected to said cover and being resiliently yieldable relative thereto in the application and removal of the cover with respect to the wheel.

18. In a wheel structure including a flanged tire rim having generally axial and radial flanges, a circular wheel cover contoured cross sectionally to extend axially and radially inside said rim flanges and spaced concealed sets of cover retaining spring fingers on the rearside of said cover and extending rearwardly therefrom, each of said sets of fingers including a turned resilient portion having a bend and a radially outer relatively short stiff angled extremity terminating in an edge for sliding and gripping engagement with the axial rim flange and also having an opposite bend portion with a resilient free end for cushioning and cover centering engagement with said radial rim flange adjacent said axial rim flange, said rearside of the cover being outwardly dished and inwardly hollow in cross-sectional shape and said sets of fingers each comprising a portion fastened therein.

19. In a wheel structure including a flanged tire rim having generally axial and radial flanges, a circular wheel cover contoured cross-sectionally to extend axially and radially inside said rim flanges and spaced concealed sets of cover retaining spring fingers on the rearside of said cover and extending rearwardly therefrom, each of said sets of fingers including a turned resilient portion having a bend and a radially outer relatively short stiff angled extremity terminating in an edge for sliding and gripping engagement with the axial rim flange and also having an opposite bend portion with a resilient free end for cushioning and cover centering engagement with said radial rim flange adjacent said axial rim flange, said spring finger portions extending on opposite sides of the junction of said rim axial and radial flanges with the junction of said flanges projecting axially between said portions.

20. In a wheel structure including a flanged tire rim having generally axial and radial flanges, a circular wheel cover contoured cross sectionally to extend axially and radially inside said rim flanges and spaced concealed sets of cover retaining spring fingers on the rearside of said cover and extending rearwardly therefrom, each of said sets of fingers including a rearwardly extending relatively straight resilient axial leg terminating in a short stiff radially inclined angled edge for sliding and gripping engagement with the axial rim flange and also having an opposite bend portion with a resilient free end for cushioning and cover centering engagement with said radial rim flange adjacent said axial rim flange.

21. In a wheel structure including a flanged tire rim having generally axial and radial flanges, a circular wheel cover contoured cross sectionally to extend axially and radially inside said rim flanges and spaced concealed sets of cover retaining spring fingers on the rear-side of said cover and extending rearwardly therefrom, each of said sets of fingers including a rearwardly extending relatively straight resilient axial leg terminating in a short stiff radially inclined angled edge for sliding and gripping engagement wth the axial rim flange and also having an opposite bend portion with a resilient free end for cushioning and cover centering engagement with said radial rim flange adjacent said axial rim flange, said spring finger portions being interconnected by an underturned portion connected to said cover and being resiliently yieldable relative thereto in the application and removal of the cover with respect to the wheel.

22. In a wheel structure including a flanged tire rim having generally axial and radial flanges, a circular wheel cover contoured cross sectionally to extend axially and radially inside said rim flanges and spaced concealed sets of cover retaining spring fingers on the rear-side of said cover and extending rearwardly therefrom, each of said sets of fingers including a rearwardly extending relatively straight resilient axial leg terminating in a short stiff radially inclined angled edge for sliding and gripping engagement wth the axial rim flange and also having an opposite bend portion with a resilient free end for cushioning and cover centering engagement with said radial rim flange adjacent said axial rim flange, said rearside of the cover being outwardly dished and inwardly hollow in cross-sectional shape and said sets of fingers each comprising a portion fastened therein.

23. In a wheel structure including a flanged tire rim having generally axial and radial flanges, a circular wheel cover contoured cross sectionally to extend axially and radially inside said rim flanges and spaced concealed sets of cover retaining spring fingers on the rearside of said cover and extending rearwardly therefrom, each of said sets of fingers including a rearwardly extending relatively straight resilient axial leg terminating in a short stiff radially inclined angled edge for sliding and gripping engagement with the axial rim flange and also having an opposite bend portion with a resilient free end for cushioning and cover centering engagement with said radial rim flange adjacent said axial rim flange, said spring finger portions extending on opposite sides of the junction of said rim axial and radial flanges with the junction of said flange projecting axially between said portions.

24. In a cover structure for a wheel including body and multi-flange tire rim parts, a dished circular wheel cover having an annular portion indented toward the junction of the wheel parts and a plurality of cover retaining spring clips at one radial side of said indented annular portion and at the inner side of the cover, each of said clips including a pair of free legs fastened at their junction to said one radial side of said annular cover portion, one of the legs extending generally axially inwardly and having its end angled for cover retaining engagement with the rim flange and the other and axially outer leg having its free extremity formed for cushioning and guiding engagement with the flanged rim.

References Cited in the file of this patent

UNITED STATES PATENTS

| | | |
|---|---|---|
| Re. 19,467 | Lyon | Feb. 12, 1935 |
| 2,174,087 | Horn | Sept. 26, 1939 |
| 2,193,104 | Lyon | Mar. 12, 1940 |
| 2,309,519 | Lyon | Jan. 26, 1943 |
| 2,351,655 | Aske | June 20, 1944 |
| 2,368,228 | Lyon | Jan. 30, 1945 |
| 2,368,230 | Lyon | Jan. 30, 1945 |
| 2,669,487 | Horn | Feb. 16, 1954 |